United States Patent

[11] 3,612,573

| [72] | Inventor | James E. Hoffman |
| | | Glenview, Ill. |
| [21] | Appl. No. | 26,000 |
| [22] | Filed | Apr. 6, 1970 |
| [45] | Patented | Oct. 12, 1971 |
| [73] | Assignee | Roseman Mower Corporation |
| | | Glenview, Ill. |

[54] GANG MOWER
5 Claims, 5 Drawing Figs.

[52] U.S. Cl.................................................. 280/411 C,
56/7
[51] Int. Cl.................................................. B62d 53/00
[50] Field of Search........................................... 280/411;
56/7, 6

[56] References Cited
UNITED STATES PATENTS

| 1,446,608 | 2/1923 | Arnold......................... | 280/411 C |
| 1,663,900 | 3/1928 | Braun........................... | 56/7 |
| 1,818,487 | 8/1931 | Lontz........................... | 56/7 |
| 2,177,189 | 10/1939 | Roseman...................... | 56/7 |
| 2,830,421 | 4/1958 | Blue et al...................... | 56/7 |
| 2,890,561 | 6/1959 | Bonner et al. ................ | 56/7 |

*Primary Examiner*—Leo Friaglia
*Attorney*—Parker, Carter & Markey

ABSTRACT: A gang mower having a center frame, a right frame and a left side frame. The side frames are adapted to have mowers attached thereto and an additional mower is towed rearwardly of the side frames. The side frames are independently connected to the main frame to permit each side frame to pivot about both a transverse axis and a longitudinal axis while restraining the side frames against movement about vertical axes. The side frames are connected to each other by a spacer bar which is pivotally connected at its opposite ends to the side frames. A boom is supported on the spacer bar and is pivotally connected at its forward end to the main frame. The boom is mounted to move vertically relative to said spacer bar for a limited distance.

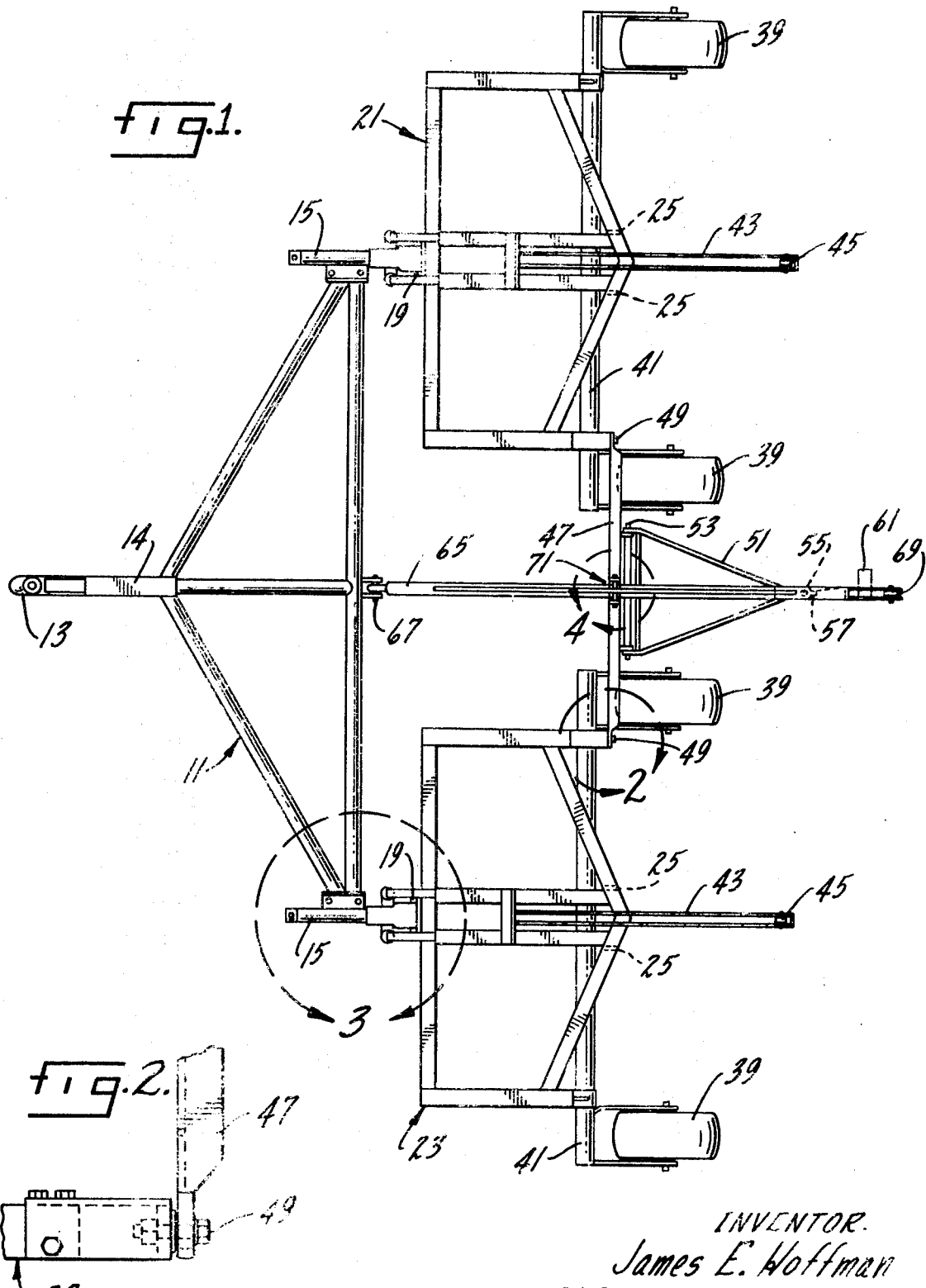

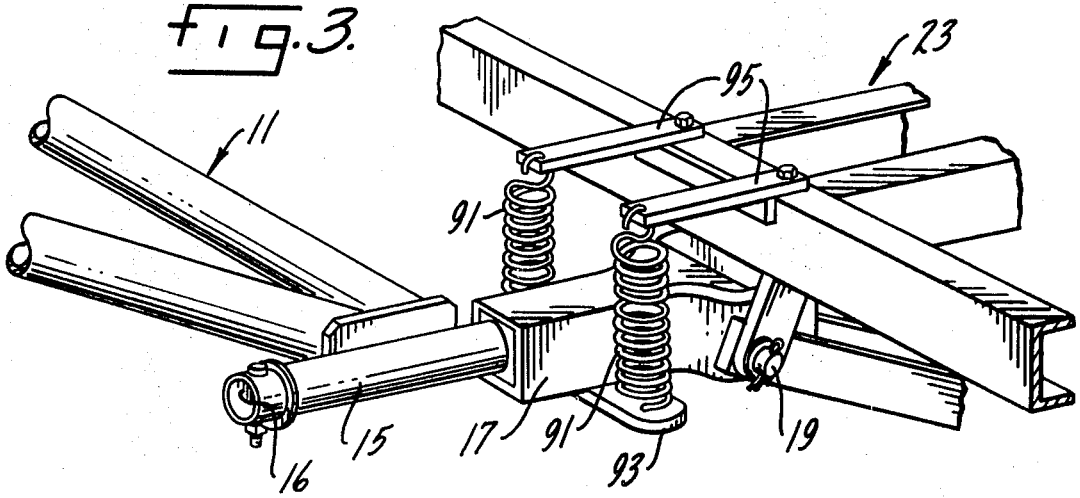
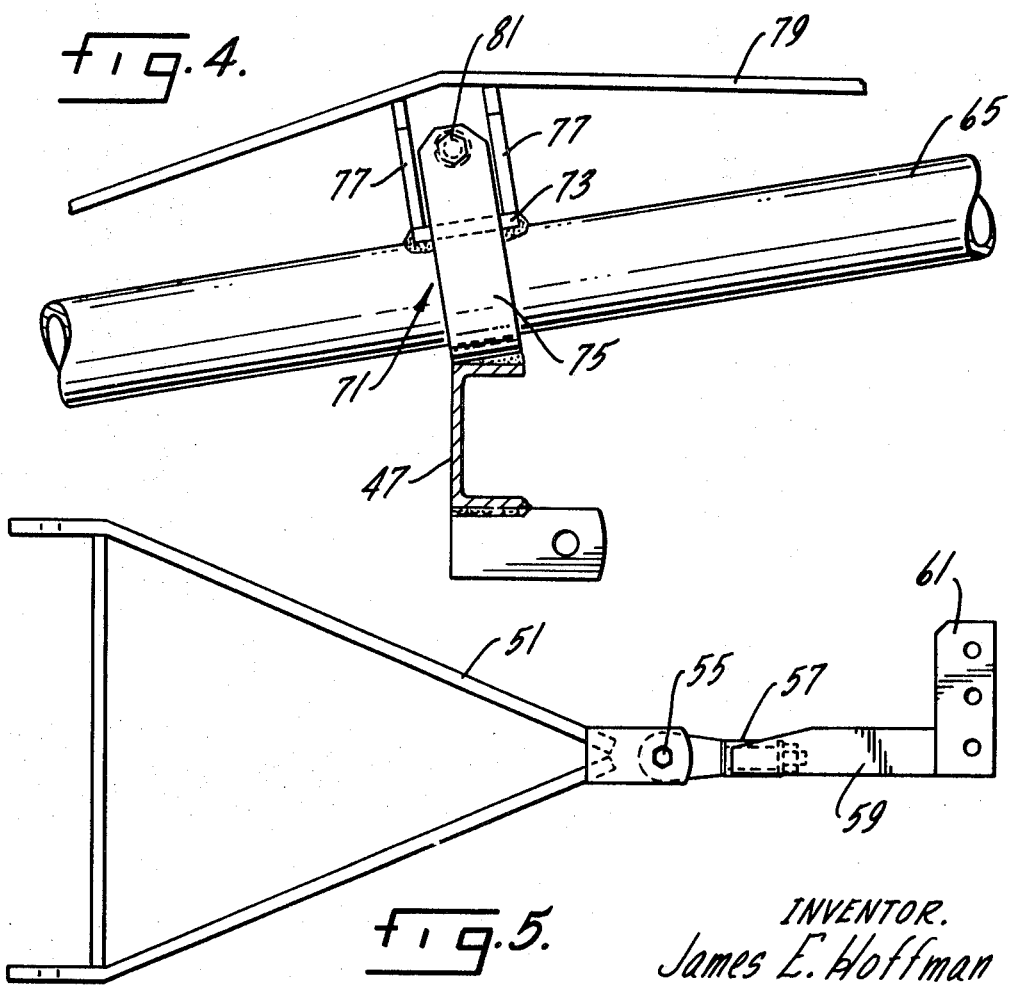

GANG MOWER

SUMMARY OF THE INVENTION

This invention is concerned with a gang mower and particularly with a gang mower that can operate efficiently over undulating or uneven ground.

An object of this invention is a gang mower that can be constructed of standard mower units.

Another object is a seven gang mower having right and left side frames with three mowers mounted on each side frame and the seventh mower located rearwardly and between the side frames.

Another is a seven gang mower having right and left side frames in which the side frames are connected so that they can move vertically relative to each other and to a center towing frame.

Another object is a gang mower in which part of the weight of the mowers is applied to the front mowers.

Another object is a gang mower that can negotiate rough ground in its transport condition.

BRIEF DESCRIPTION OF THE DRAWINGS

The invention is illustrated more or less diagrammatically in the following drawings wherein:

FIG. 1 is a top plan view of a gang mower, with the mowers and other parts omitted, embodying the novel features of this invention;

FIG. 2 is an enlarged, partial plan view of the area encircled on FIG. 1 and designated by the numeral 2;

FIG. 3 is an enlarged, partial perspective view of the area encircled on FIG. 1 and designated by the numeral 3;

FIG. 4 is an enlarged, partial side elevational view of the area encircled on FIG. 1 and designated by the numeral 4; and FIG. 5 is an enlarged top plan view of a portion of the apparatus of FIG. 1;

DESCRIPTION OF THE PREFERRED EMBODIMENT

This invention is shown embodied in a seven gang mower which includes a main frame 11 formed of tubing welded into a generally triangular configuration. A tractor hitch socket 13 is connected to a support 14 which extends forwardly of the main frame. Sleeves 15 rigidly bolted to the opposite corners of the main frame receive tubes 16 attached to pivot tongues 17 which are pivotally connected at 19 to right side transport frame 21 and left side transport frame 23.

Two mowers are carried by each side frame and a third mower is towed behind each side frame by means of a yolk which is pivotally connected to tabs 25 of each frame. A swivel connection joins the rear end of the yolk to the mower. Each mower consists of a hollow roller and a reel blade. Caster wheels attached to the front of the side frames. The mowers, yokes, swivel connections and caster wheels are well known in the art and are omitted from the drawings for clarity of illustration.

Transport wheels 39 are mounted on tubes 41 which may be rotated by hydraulic cylinders (not shown) to move the wheels into and out of contact with the ground for transport or for operation. A boom 43 is rigidly connected to each side frame 21 and 23 and extends rearwardly thereof to overhang the mower (not shown) which trails the frame. A pulley 45 is mounted on the rear of the boom to receive a chain (not shown) which connects to the trailing mower.

A spacer bar 47 extends between the side frames 21, 23 and is pivotally connected to each side frame by spherical bearings 49 with the pivotal axes of the connections extending longitudinally and generally horizontally. A yolk 51 is pivotally connected at 53 to the spacer bar with the axis of the connection extending generally transversely and horizontally. The rear end of the yoke has a vertical swivel 55 which attaches the yoke to a longitudinally extending swivel 57. The longitudinal swivel is connected to a strap 59 which clamps to the rearmost mower (not shown) through means of a sleeve (not shown). The sleeve is bolted to a tab 61.

A boom 65 is pivotally connected by a spherical bearing 67 at its front end to the main frame 11. A pulley 69 is attached to the rear end and is located above the rear mower (not shown). The middle portion of the boom 65 rests in a U-shaped support 71 which is attached at its bight portion to the spacer bar 47 and is tilted from the vertical so that it is generally normal to the axis of the boom. A flat plate 73 is welded to the upper surface of the boom and is positioned between the legs 75 of the U-shaped support. A pair of spaced uprights 77 are attached to the top of the plate 73 and the upper ends of these uprights are welded to a tension bar 79 which extends along the length of the boom and is welded to the boom at its opposite ends. A bolt 81 extends through openings (not shown) in the legs 75 of the U-shaped support 71 and passes between the spaced uprights 77. A sleeve (not shown) fits over the bolt 81. Referring to FIG. 3 of the drawings, tension springs 91 are attached to tabs 93 welded to the pivot tongues 17 and to tabs 95 affixed to the side frames 21 and 23. The tension springs 91 bias the side frames 21 and 23 towards the main frame 11.

The use, operation and function of the invention are as follows:

The seven gang mower of this invention will negotiate rough terrain both when operating and when being transported. This is accomplished by providing vertical flexibility between the main frame which connects to the tractor and the side frames which attach to the mowers. The seven gang mower shown in this embodiment of the invention is converted from its operating condition to a transporting condition through means of hydraulic cylinders (not shown) powered by a source of hydraulic pressurized fluid on the tractor to rotate the wheels 39 to lift the frames and mowers off the ground. The booms 43 and 65 assist in lifting the trailing mowers when the wheels lift the side frames from the ground.

When moving over extremely rough ground in the cutting position, the side frames 21 and 23 must be free to move vertically relative to one another and relative to the main frame 11 while being restrained against lateral movement so that the mowers maintain their proper lateral relationship to one another. This is accomplished by connecting the side frames 21 and 23 to the main frame by means of swivel connections that extend longitudinally and generally horizontally and pivotal connections that extend laterally and generally horizontally. This combination, in effect forms a universal joint which allows each side frame to move up and down about both a longitudinal and a lateral axis relative to the main frame. The longitudinal swivel connections are formed by the sleeves 15 and the tubes 16 received in the sleeves. The horizontal pivotal connections are formed by the pivot pins at 19.

The side frames 21 and 23 are connected to each other by the spacer bar 47 which is pivotally connected by the spherical bearings 49 to each side frame about longitudinally extending, generally horizontal axes. Therefore, the side frames 21 and 23 may also move vertically relative to each other and twist slightly while being restrained against lateral movement relative to each other.

The center boom 65 is free to move vertically relative to the spacer bar 47 and is free to rotate about a horizontal axis relative to the main frame 11 because of the pivotal connection of the spherical bearing 67. Thus, the boom will not be adversely affected by the movement of the side frames 21 and 23 relative to each other.

The tension springs 91 which bias the side frames 21 and 23 towards contact with the pivot tongues 17 in effect transfer part of the weight of the structure to the front mowers. This aids in maintaining the front mowers in proper contact with the ground during cutting operation. Since the springs are mounted on the pivotal tongues 17 and not on the main frame 11, they will maintain downward pressure on the side frames even as the side frames move vertically up and down about the pivot tongue and relative to the main frame.

I claim:

1. A gang mower including:
a center frame, a left side frame and a right side frame, said side frames formed and adapted to have mowers connected thereto, means independently connecting said side frames to said main frame to permit each side frame to pivot about both a transverse axis and a longitudinal horizontal axis while restraining said side frames against movement about vertical axes, a spacer bar extending between said side frames and pivotally connected at its opposite ends to said side frames, said pivotal axes extending generally longitudinally and horizontally, and means pivotally mounted on said spacer bar and adapted to pull a mower located rearwardly of said side frames.

2. The structure of claim 1 further characterized in that an elongated boom is pivotally connected at its forward end to said center frame for movement about a transverse horizontal axis and is supported near its midpoint on said spacer bar with said boom extending rearwardly of said spacer bar.

3. The structure of claim 2 further characterized in that said boom is mounted for limited vertical movement relative to said spacer bar.

4. The structure of claim 1 further characterized in that means are provided to bias the forward ends of said left side frame and right side frame downwardly towards said center frame.

5. The structure of claim 4 further characterized in that said biasing means is supported to pivot above a horizontal longitudinal axis relative to said center frame.